United States Patent [19]

Chatlos

[11] 4,393,753

[45] Jul. 19, 1983

[54] ATTACHMENT FOR MOTOR VEHICLES WITH REAR WINDOWS

[75] Inventor: Richard Chatlos, Johnstown, Pa.

[73] Assignee: Air-O-Scoop Corporation, Johnstown, Pa.

[21] Appl. No.: 377,564

[22] Filed: May 12, 1982

Related U.S. Application Data

[63] Continuation of Ser. No. 194,224, Oct. 6, 1980, Pat. No. 4,346,648, which is a continuation-in-part of Ser. No. 118,444, Feb. 4, 1980, Pat. No. 4,326,451.

[51] Int. Cl.³ .................................................. B10J 1/20
[52] U.S. Cl. ................................... 98/2.12; 114/211; 296/146
[58] Field of Search ............... 98/2.12, 2.13; 296/146, 296/91, 90; 49/71, 390, 391; 114/202, 203, 211, 221

[56] References Cited

U.S. PATENT DOCUMENTS 1,777,326  10/1930  Potter .................................... 98/2.12
1,895,109   1/1933  Suddards ............................... 98/2.12
2,106,418   1/1938  Wagner .................................. 98/2.13

Primary Examiner—Richard A. Bertsch
Attorney, Agent, or Firm—Fisher, Christen & Sabol

[57] ABSTRACT

An air flow device for positioning in the rear windows of closed motor vehicles and boats. The device has a frame which fits within the window or an unclosed portion of the window. Means are provided for attaching the device frame to the window frame. A transparent plate is attached at its bottom to the bottom portion of the device frame on its side inside of the motor vehicle. The transparent plate is positioned at its top away from the top of the device frame (or the vertical plane of the window). A gap exists between the top of the device frame and the top of the plate. There are two side members, each of which is attached to a set of corresponding ends of the device frame and the plate. The side members prevent lateral air flow into the motor vehicle.

18 Claims, 26 Drawing Figures

U.S. Patent  Jul. 19, 1983  Sheet 1 of 7  4,393,753
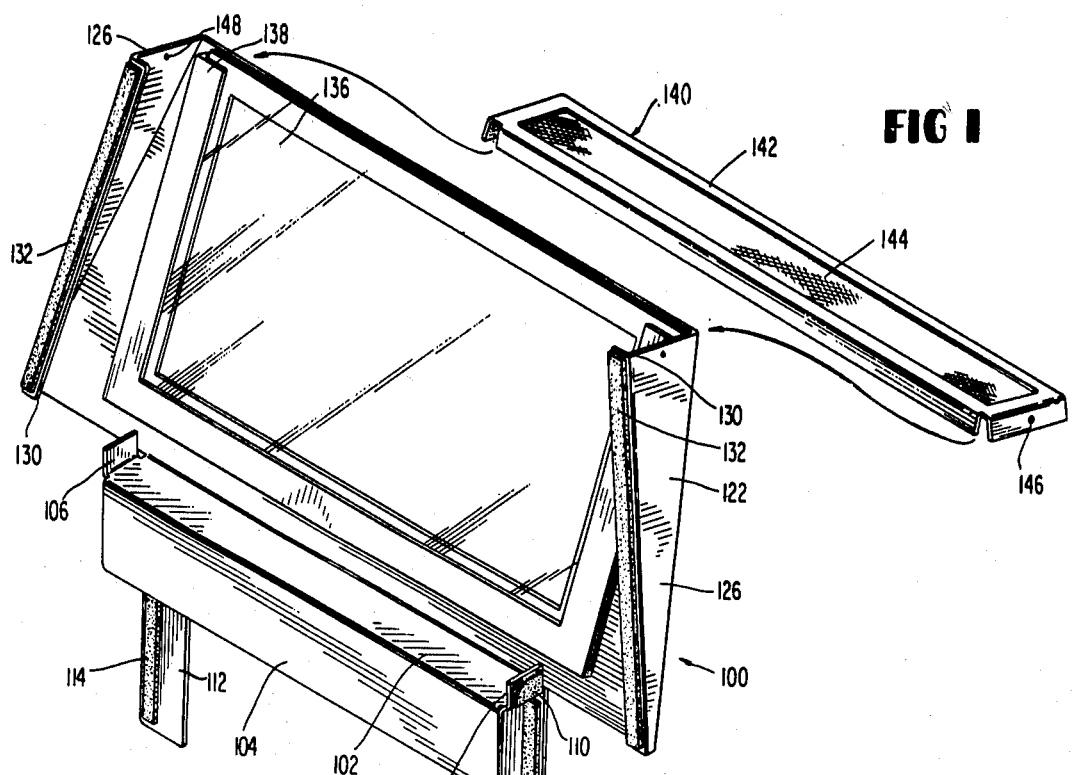
FIG 1
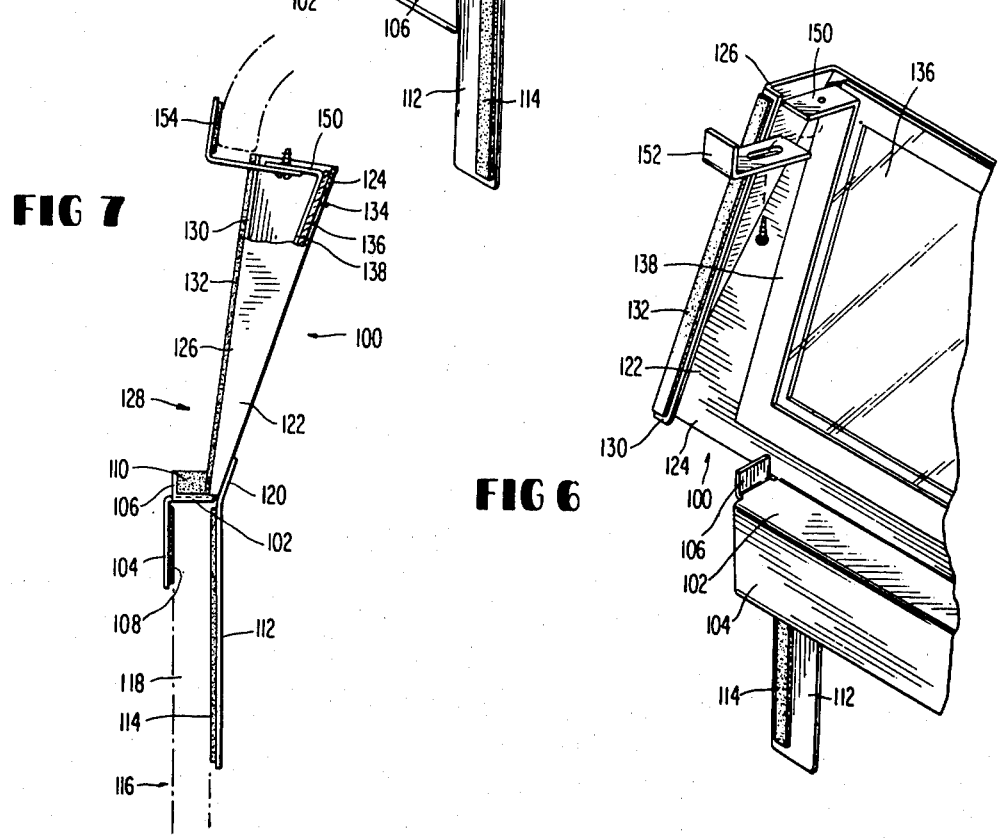
FIG 7
FIG 6

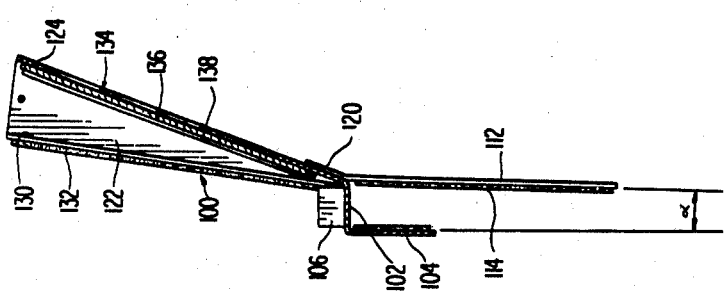
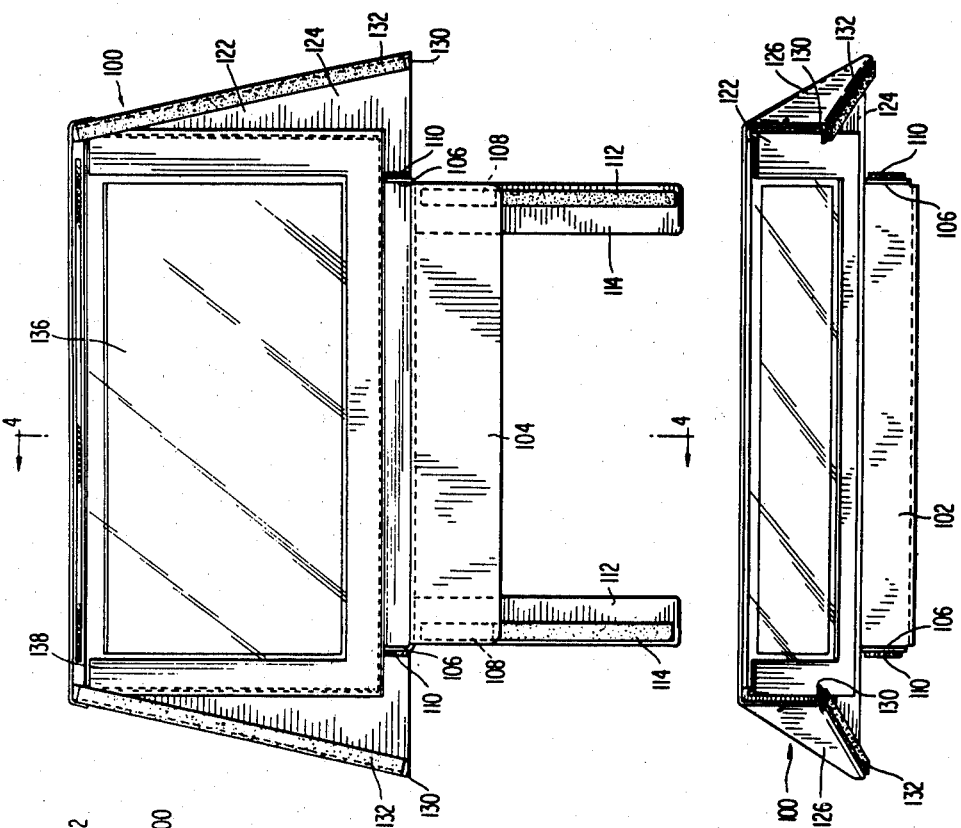
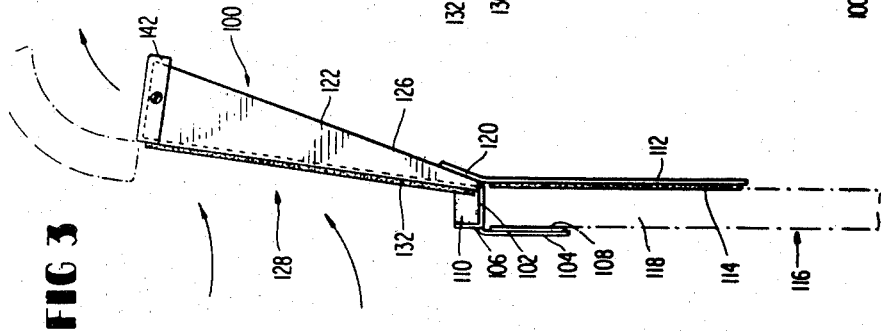
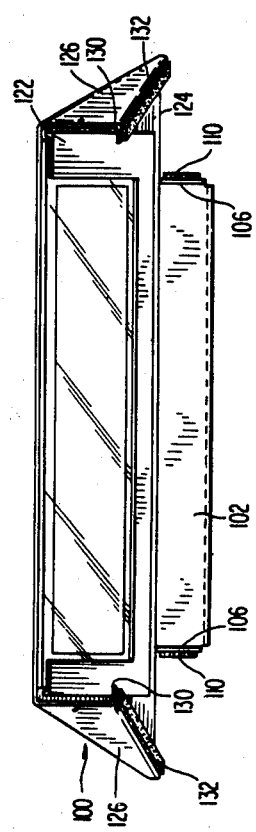

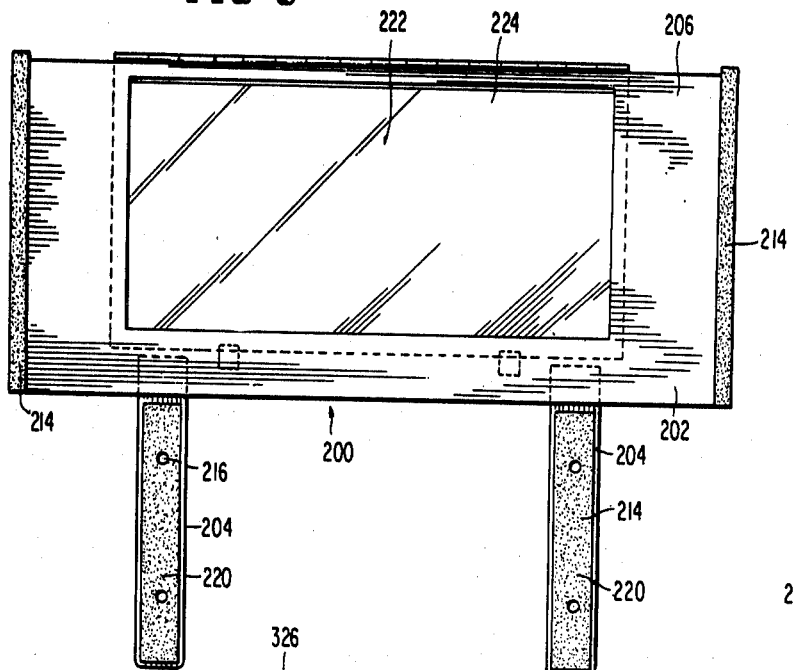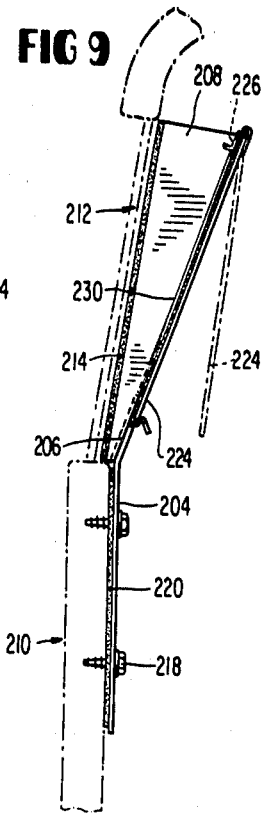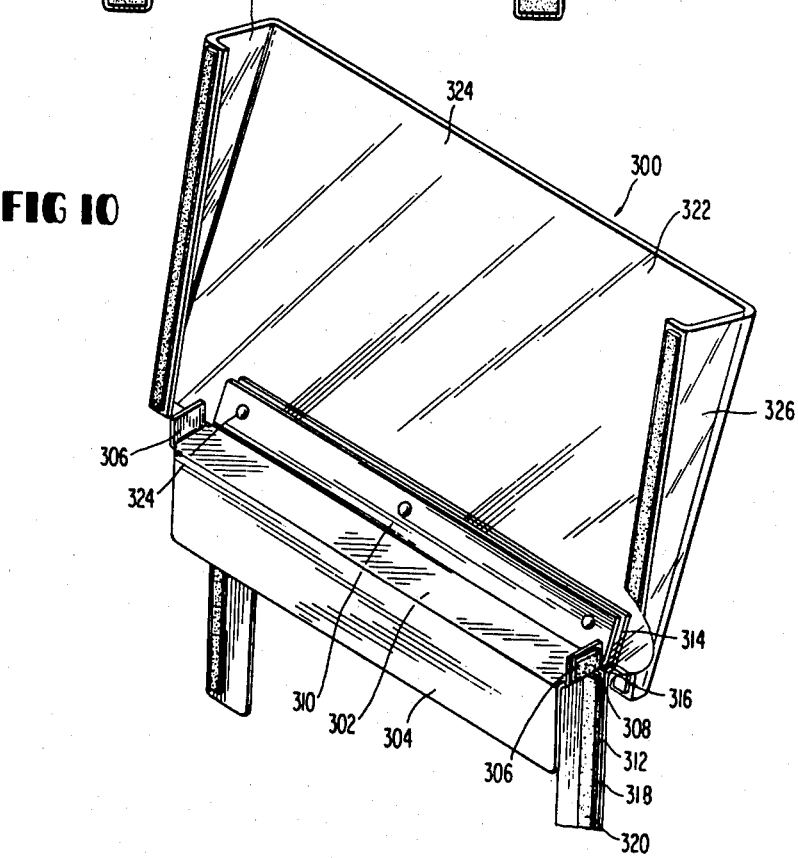

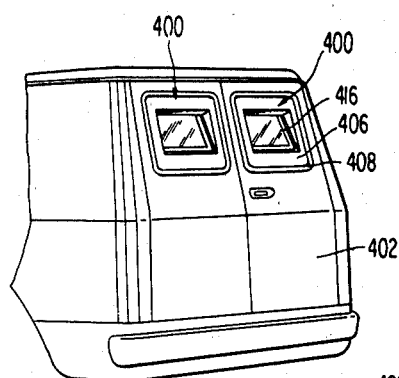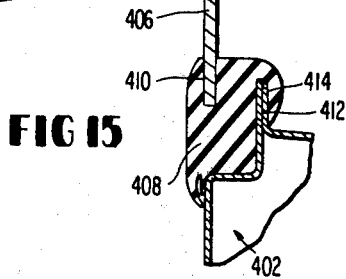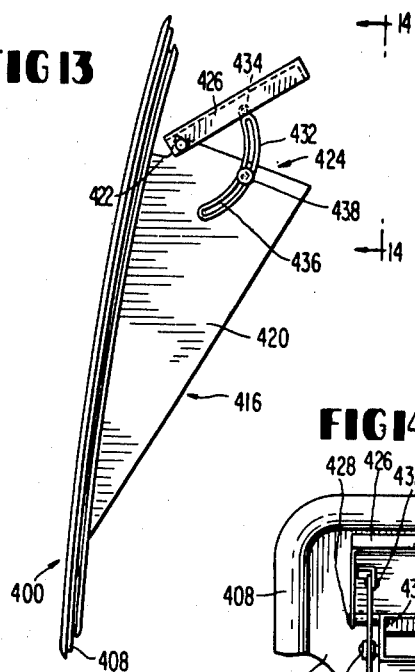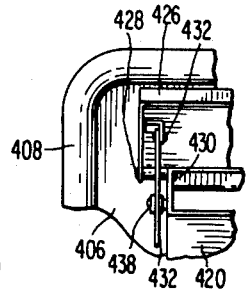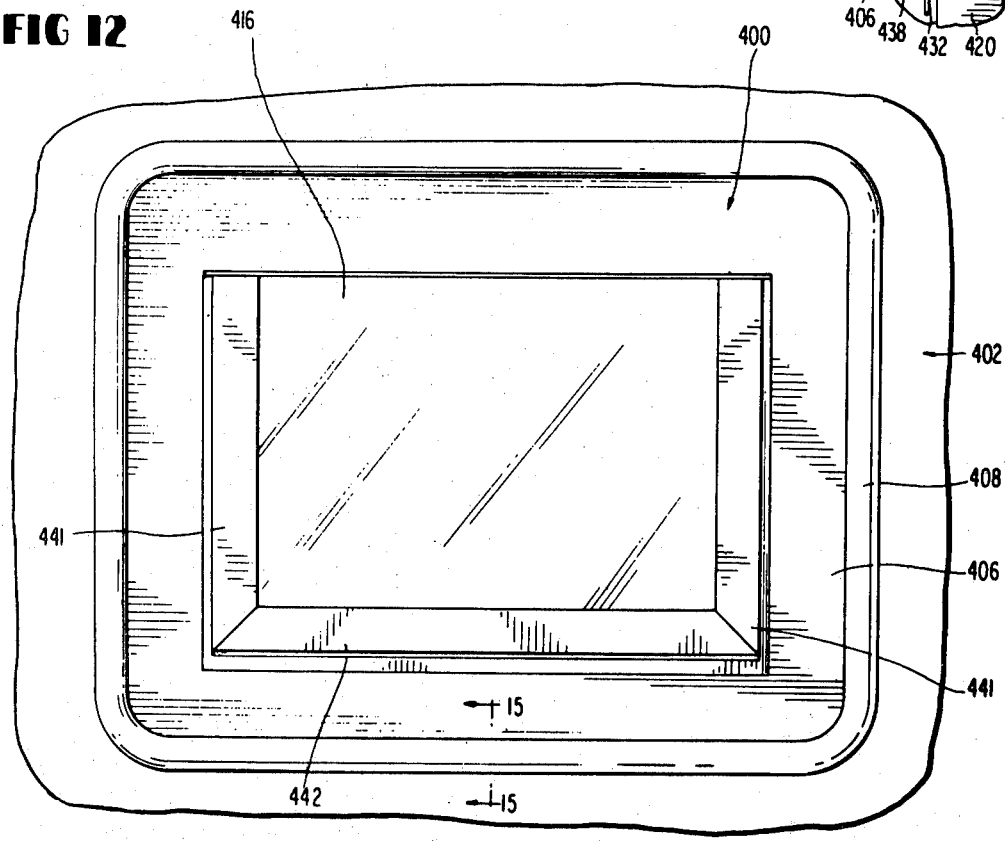

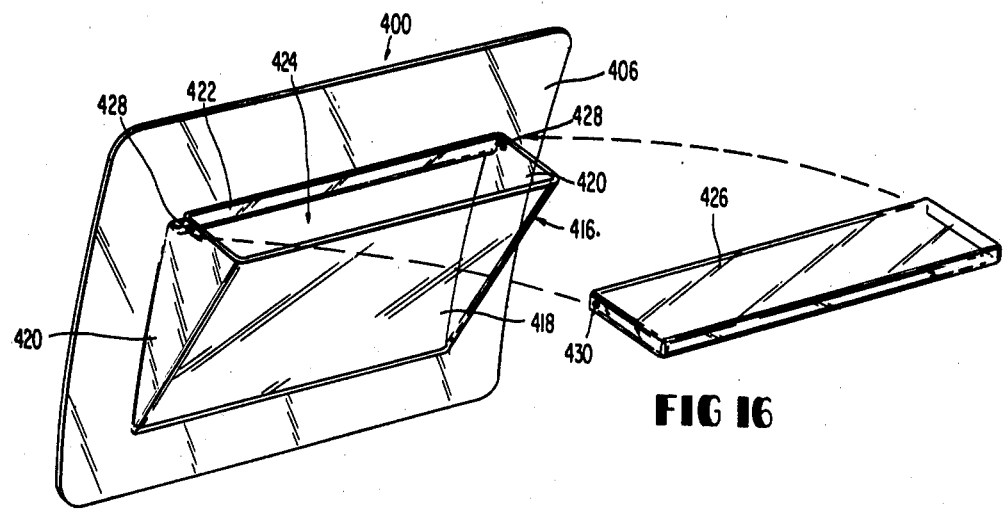
FIG 16
FIG 17
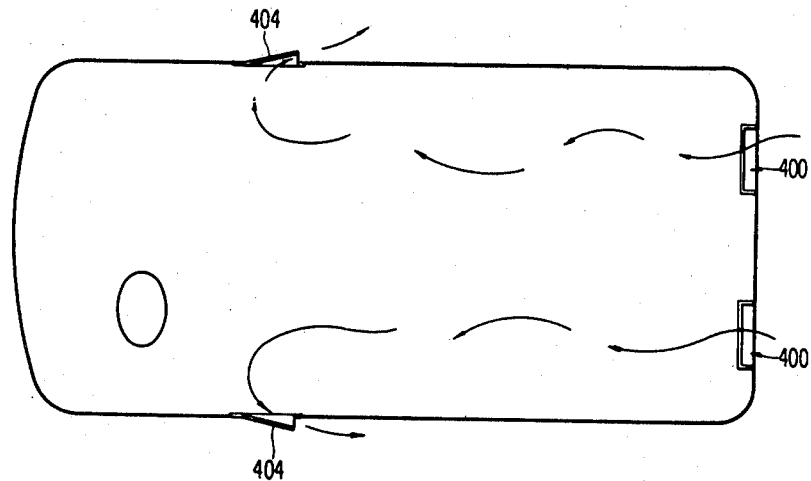

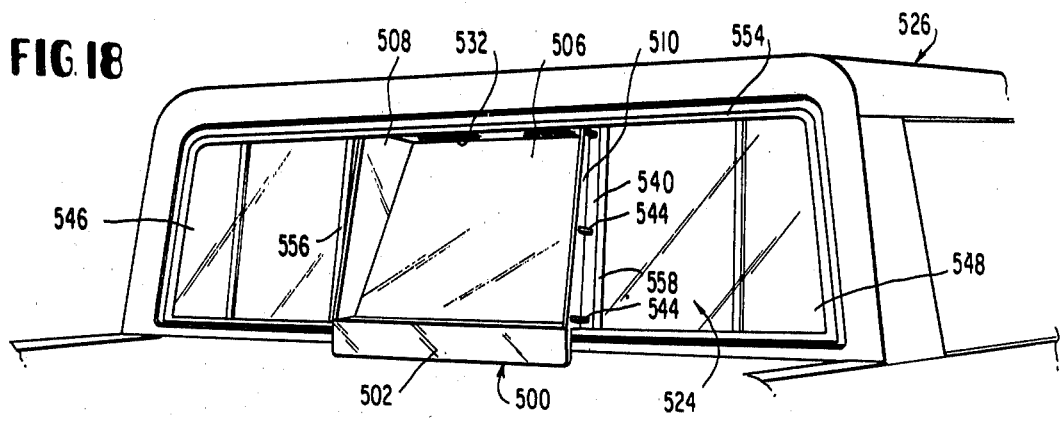
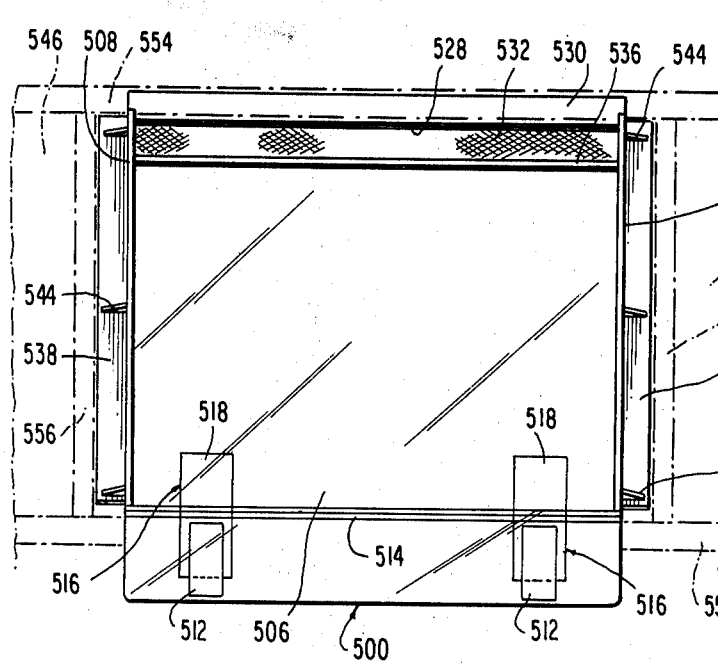
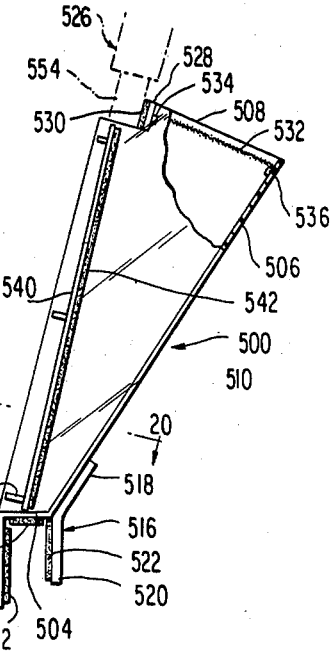
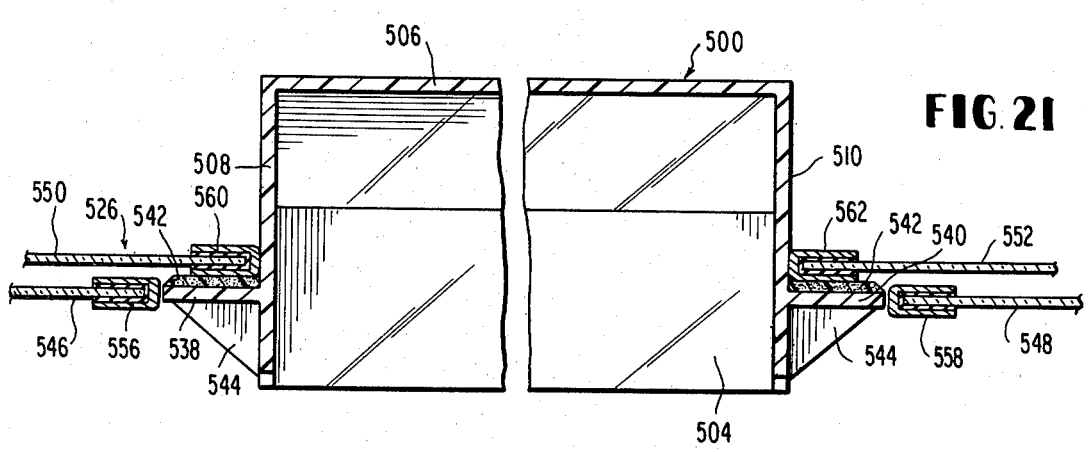

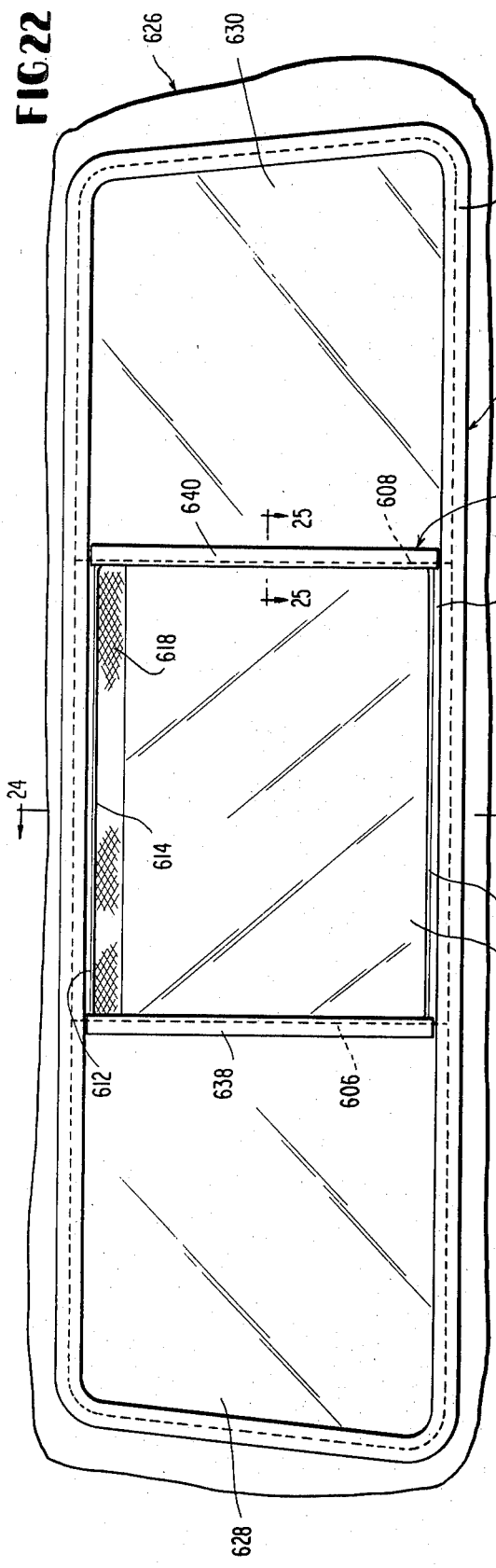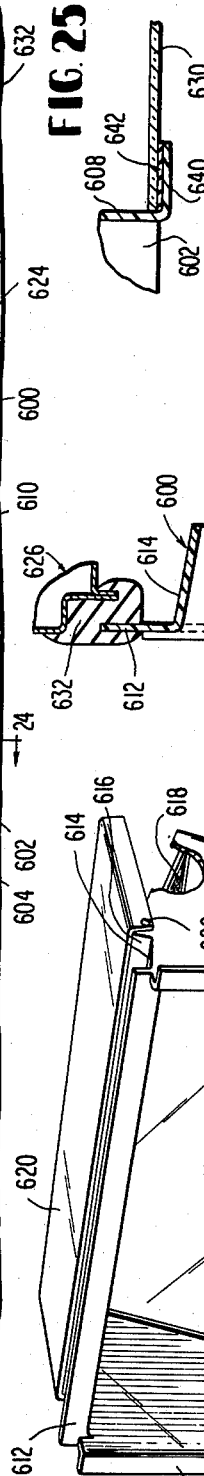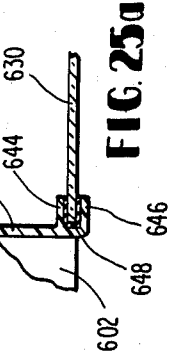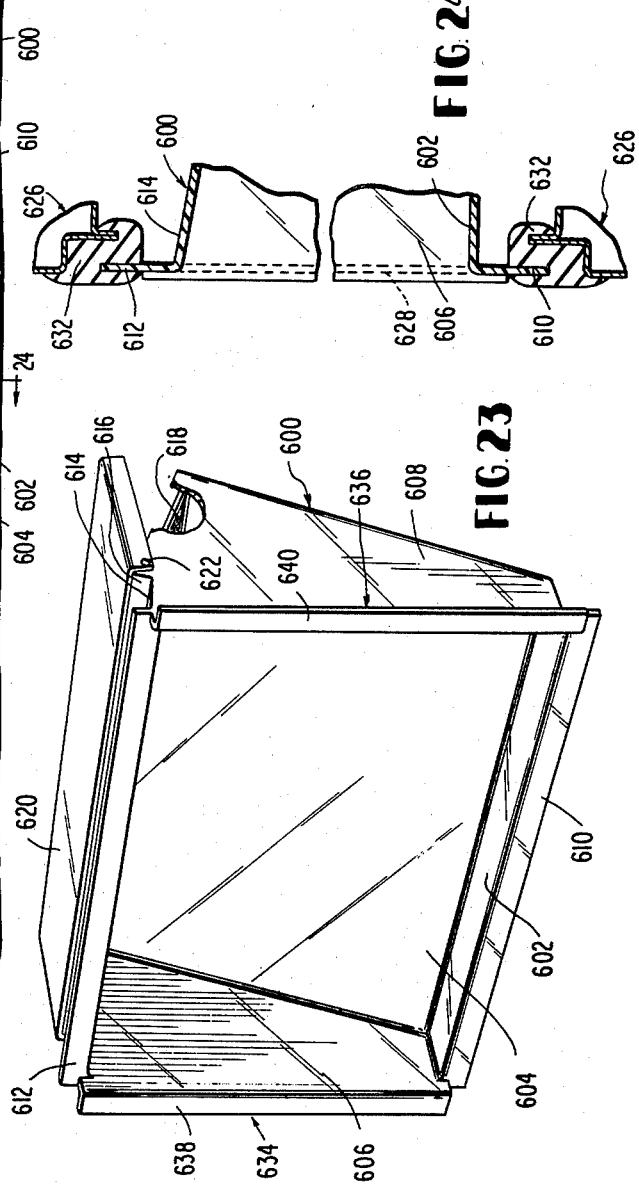

ATTACHMENT FOR MOTOR VEHICLES WITH REAR WINDOWS

This is a continuation of application Ser. No. 194,224, filed on Oct. 6, 1980, now U.S. Pat. No. 4,346,648, issued on Aug. 31, 1982, which is a continuation-in-part of application Ser. No. 118,444, filed on Feb. 4, 1980, now U.S. Pat. No. 4,326,451, issued on Apr. 27, 1982.

BACKGROUND OF THIS INVENTION

1. Field of This Invention

This invention relates to the field of ventilators or air flow devices of motor vehicles.

2. Prior Art

When the rear cab window of a pick-up truck or the like is open, the flow of air can cause soreness of the neck and arms and blow a person's hair. The elimination of these disadvantages and occupant annoyances have been the objective of prior, but unsuccessful, inventors, as often the best previous solution had been to shut the rear cab window.

Some of the prior art ventilators allowed the entry of water into the car or motor coach during rainstorms.

U.S. Pat. No. 1,895,109 (Suddards) teaches a ventilator for the rear window of a closed motor car, coach and the like. The ventilator has a louver for positioning in the aperture usually occupied by the rear light or rear window. The louver is a number of strips pivotally mounted each about one edge and operatively connected for movement together. The ventilator also has a deflector screen associated with the louver so as to provide an opening at its upper position. There is a movable flap for controlling the flow of air through the ventilator. The movable flap is mounted for pivotal movement with its free edge cooperating with the upper edge of the deflector screen.

The deflector screen of Suddards is positioned on the inside of the car and the louver is positioned on the outside of the car. Suddards states that its air flow pattern is from inside of the car to outside of the car. To achieve this flow path, it is quite apparent that Suddards would have to open at least one side or front window, at least partially. Flaps or strips D cannot rise above the horizontal due to the top frame of the ventilator, due to the central pivot mounting of the flaps and due to connecting bar F. Since Suddards states his air flow path is from inside of the car outwards, there is no need or desire for flaps D to rise above the horizontal.

Flaps D of U.S. Pat. No. 1,895,109 (Suddards), which do not rise above the horizontal, would effectively render the air flow device of this invention useless by blocking the air flow from over the top of the car, down the back of the car and around, up and through the air flow device of this invention. Suddards asserts an air flow through its ventilator from inside of the car to the outside—applicant achieves an air flow through applicant's air flow device from outside of the car to the inside. The air flow device of this car does not use louver flaps, even ones that can rise above the horizontal. Louver flaps would not pass state and federal vehicle safety inspections. Glass louvers present a safety problem for a person riding in the bed of a pick-up truck. Where a camper is mounted in the bed of a pick-up truck, the louvers would totally block air flow and may not even fully open.

Suddards does not have any side panels, which allow air flow through the truck at head and shoulder level of the driver or passenger. This would cause sore arms, necks, etc., and blown hair.

In Suddards, since its ventilator has no side panels, the louver (flaps) must be closed to keep water and snow out. The mounting or installation of Suddards' ventilator would not be easy. There would be poor air quality in a vehicle having Suddards' ventilator. Suddards' ventilator would not be maintenance free, would not be easy to install or would not be easy to remove or clean. In modern vehicles, the rear window is designed altogether differently, making it difficult to install Suddards' ventilator. Suddards' ventilator is not applicable for current recreation vehicles—the design of windows and/or rear windows makes Suddards' ventilator nonapplicable for the current design of such windows. Suddards' ventilator has no removable openings or louver flaps for rear view.

In order for passengers to ride in a recreation camper of a pick-up truck there should be communication with the cab of the recreation vehicle as well as with those in the recreation camper. With the Suddards' louvers, state and federal regulations would not permit louvers in a rear light or rear window of such recreation vehicle and camper. Louvers in a recreation vehicle would hinder communication with passengers in the recreation camper.

BROAD DESCRIPTION OF THIS INVENTION

An object of this invention is to provide a new and improved air flow device for the rear aperture of motor vehicles. Other objects and advantages of this invention are set out herein or are obvious herefrom to one ordinarily skilled in the art.

The objects and advantages of this invention are achieved by the device of this invention.

This invention involves an air flow device for closed motor vehicles and boats for positioning in the rear aperture thereof. The device or ventilator has a frame which fits within the aperture of an unclosed portion of the aperture. Usually the aperture is a rear window. Means are provided for attaching the device frame to the aperture frame. A plate is attached at its bottom to the bottom portion of the device frame on its side inside of the motor vehicle or the boat. The transparent plate is positioned at its top away from the top of the device frame (or the vertical plane of the aperture). There is a gap between the top of the device frame and the top of the plate. At least the majorit and center section of the plate is transparent. There are two side members, each of which is attached to a set of corresponding ends of the device frame and the plate. The side members prevent lateral air flow.

When the rear cab window of a pick-up truck or the like is open, the flow of air can cause soreness of the neck and arms and blow a person's hair. These disadvantages and occupant annoyances are eliminated by the device of this invention without having to shut the rear vehicle window.

When the device of this invention is installed in the rear cab window, the window can be left open during rainstorms. Even during a severe rainstorm lasting several hours, no water will enter the cab of the vehicle from the opened rear window. The side windows can be practically shut (or open about ½ inch on each side) during rainstorms, with the result that the side and rear windows and windshield will not fog. The air temperature in the cab will remain comfortable without the use of an air conditioner or dehumidifier. The use of this invention allows one to continue driving during a rainstorm while other vehicles have to pull off the road.

For trucks or other motor vehicles having a sliding rear window, the air flow device is easily installed. The installation can be temporary or can be made permanent (as the owner desires). Many present day recreation vehicles, trucks and other motor vehicles have sliding rear windows.

The air flow device of this invention can be made out of all plastic or out of all aluminum or out of all metal or combined plastic with aluminum or plastic with metal. It can be produced out of an aluminum frame with center made of a durable transparent plastic or glass. Its basic materials are aluminum or plastic or both combined or metal combined plastic with aluminum or plastic with metals. It is lightweight in nature and durable—this feature makes it maintenance free. The nature of the air flow device makes it simple to install and remove in a motor vehicle or recreation vehicle. The air flow device allows air to flow in the vehicle without hindering passengers riding in the vehicle. The air flow device allows air to be distributed in vehicle or recreation vehicle which results in making the driver and/or passengers very comfortable. It is advisable that the center of the air flow device be constructed of clear plastic so as to give the driver of the vehicle a clear view of rear traffic. The center or base should be made of a clear durable plastic in order for the air flow device to pass state and federal inspections. Since some vehicles contain a closed-in camper the sight from the rear view mirror is obstructed on such type of vehicle and is replaced by side view mirrors. It would be up to the choice of the owner if he desires the air flow device to be all aluminum or all plastic model or metal or a combination of all three. The air flow device can be designed and constructed to accommodate all vehicles and/or recreation vehicles with rear sliding windows. At the top of the air flow device, where the air enters the vehicle, a screen can be inserted to prevent foreign matter or insects from entering the vehicle.

Installation of the air flow device in a sliding rear window can be done in several ways. If the vehicle owner desires to put the air flow device in the base of the window permanently, the apron of the air flow device can be eliminated. The owner of the vehicle can attach by drilling holes in the vehicle and attaching the air flow device to the base of the window permanently with rubber in between the air flow device and the base of the window. It is advisable to use self-tapping screws. This arrangement permits the rear window to be closed or opened as desired. To temporarily install the air flow device, the following steps are used: open the rear sliding window of the vehicle or recreation vehicle, and easily slide it into such window.

In one embodiment of this invention the air flow device is for a closed motor vehicle or boat which has a rear aperture containing a window frame. Two outer window sections, which are stationary, are mounted in the end portions of the window frame. Such two outer window sections are of such size as to form an opening therebetween. Two inner window sections are slidably mounted in the window frame. The two inner window sections are of such size as to close off the opening when the two inner window sections are slid together and to fully open the opening when the two inner window sections are slid sufficiently far apart. The air flow device includes a base plate and means attached to the base plate for attaching the device to the bottom portion of the window frame. Preferably the means of attaching the device of the bottom portion of the window frame (and wall of the motor vehicle) are parallel, downward-extending flat members which are attached on their tip ends to the base plate. The device also has two vertical side plates, each having one end attached to the end of the base plate, and a top plate attached to the other end of each of the vertical side plates at a position back from the side of the two vertical side plates so that part of the device extends through the opening. The top plate contacts the inside surface of the top portion of the window frame. There is a back plate which is attached at its bottom to the portion of the base plate inside of the motor vehicle. The back plate is positioned with its top away from the top plate or the vertical plane of the opening thereby forming a gap between the top plate and the back plate. There are two vertical side strips, each attached at a right angle to one of the vertical side plates. The unattached vertical edge of each of the vertical side strips aligns with the end of one of the outer window sections. The end of each of the inner window sections slidably fits behind one of the vertical side strips thereby holding the device in position and preventing inward motion of the device. At least the back plate is transparent—preferably most of the parts are transparent. The two side plates are generally triangular in shape and are attached on one edge to the back plate, thereby preventing lateral air flow into the vehicle.

One embodiment of this invention is a window assembly containing an air flow device for a closed motor vehicle or boat for positioning in the rear aperture thereof. The window assembly includes a window frame, two outer window sections which are stationary and mounted in the end portions of the window frame, the two outer window sections being of such size as to form an opening therebetween, and the air flow device mounted in the opening. The air flow device includes a base plate, and a bottom lip attached on top to the base plate and on bottom to the bottom portion of the window frame. Preferably the window frame is a conventional rubber window molding (see FIG. 24). There are two vertical side plates, each having one end attached to the end of the base plate. There is also a narrow top horizontal plate attached on each end to the vertical side plates on the side towards the opening. A top vertical lip is attached to the edge of the top plate towards the opening. Part of the ends of the top vertical lip are attached to the side plates. A back plate is attached at its bottom to the portion of the base plate inside of the motor vehicle. The back plate is positioned with its top away from the top horizontal plate or the vertical plane of the opening thereby forming a gap between the top horizontal plate and the back plate. Also, there is an extension of the edge of each of the side plates facing the opening—such extensions provide means of sealingly engaging the end of both of the outer window sections facing the opening. At least the back plate is transparent—preferably most of the parts are transparent. The two side plates are generally triangular in shape and are attached on one edge to the back plate, thereby preventing lateral air flow into the vehicle.

Preferably the extension of the edge of each of the side plates is L-shaped. The leg thereof which is parallel to the outer window section sealingly engages the end of one of the outer windows. More preferably the extension of the edge of each of the side plates contains two short parallel strips which are perpendicular to the extension. The two short parallel strips sealingly engages therebetween the end of one of the outer windows.

DETAILED DESCRIPTION OF THIS INVENTION

Referring to the drawings in which numerals of like character designate similar parts throughout the several views:

FIG. 1 is a partly-exploded perspective view of the air flow device of one embodiment of this invention;

FIG. 2 is a back view of the device of FIG. 1;

FIG. 3 is a side view of the device of FIG. 1 mounted in a rear window of a motor vehicle;

FIG. 4 is a side sectional view of the device of FIG. 1 along line 4—4 in FIG. 2;

FIG. 5 is a top elevational view of the device of FIG. 1;

FIG. 6 is a partial perspective view of the device of FIG. 1 with a mounting bracket shown;

FIG. 7 is a side view, partially cut away, of the device of FIG. 1 mounted, with a mounting bracket in place, in a rear window of a motor vehicle;

FIG. 8 is a back elevational view of the air flow device of another embodiment of this invention;

FIG. 9 is a side sectional view of the device of FIG. 8;

FIG. 10 is a perspective view of the air flow device of another embodiment of this invention;

FIG. 11 is a perspective view of two of the air flow devices of still another embodiment of this invention mounted in the two rear windows of a van;

FIG. 12 is a front elevational view of the device of FIG. 11 mounted in a rear window of a van;

FIG. 13 is a side elevational view of the device of FIG. 11;

FIG. 14 is a partial sectional view of the device of FIG. 11 along line 14—14 in FIG. 13;

FIG. 15 is a partial sectional view of the device of FIG. 11 along line 15—15 in FIG. 12;

FIG. 16 is a partially-exploded perspective view of the device of FIG. 11;

FIG. 17 is a top sectional view of a van showing the air flow paths when two of the devices of FIG. 11 are mounted in the rear windows of the van;

FIG. 18 is a perspective view of the air flow device of a further embodiment of this invention mounted in the rear window of a pick-up truck;

FIG. 19 is a front elevational view of the device of FIG. 18;

FIG. 20 is a side elevational view, partially cut away, of the device of FIG. 18;

FIG. 21 is a side sectional view along line 21—21 in FIG. 20;

FIG. 22 is a back elevational view of the air flow device of a still further embodiment of this invention;

FIG. 23 is a perspective view of the device of FIG. 22;

FIG. 24 is a side partial sectional view along line 24—24 in FIG. 22;

FIG. 25 is a top partial sectional view of line 25—25 in FIG. 22; and

FIG. 25a is a top partial sectional view of an alternative arrangement of that shown in FIG. 25.

The preferred embodiments of this invention are illustrated in the drawings.

In FIG. 1, numeral 100 represents the air flow device of a preferred embodiment of this invention. Frame (or base plate) 102 contains downwardly-extended (back) lip 104 and two upwardly-extended lips 106 (rain shields). Other frames can be used in place of frame 102, but frane 102 is preferred. For example, the frame can be rectangular in shape, extending entirely around the inside perimeter of the vehicle's rear window. Lip 104 contains padding strip 108, and each of lips 106 contains padding strip 110. Lip 104 is located on the back side of device 100, which fits on the outside of truck cab 116—see FIG. 3. Frame 102 also contains two downwardly-extending (front) members 112, one located near each end of frame 102. The angle between the plane of frame 102 and members 112 is typically 70 degrees. Each of members 112 contains padding strip 114. Members 112 are located on the front side of device 100 and fit on the inside of truck cab 116—see FIG. 3. Lip 104 and members 112 are preferably made of a material (such as steel or preferably aluminum) which has a slight degree of springiness. Lip 104 and members 112 are slightly inclined towards each other in the direction of their lower extremities (see angle $\alpha$ illustrated in FIG. 4), that is, they show slight convergence. Lip 104 typically has a length of $4\frac{1}{8}$ inches; and lips 112 typically have a length of $10\frac{5}{8}$ inches. This allows device 100 to tightly fit over lower wall 118 of truck cab 116.

Each of members 112 has extended portion 120, which is offset slightly from the vertical. Plate unit 122 is attached at its lower extremity to extended portions 112 of members 122. Plate unit 122 includes front wall 124 and two end (side) walls 126. Front wall 124 is slanted so that its top rim is offset from the perpendicular to the horizontal plate in which frame 102 is located. The angle of offset from the perpendicular is preferably 13 degrees, but can generally be between 5 and 30 degrees, or so. The angle of offset is critical to the extent that sufficient air inflow is allowed and the angle does not become excessive, hence dangerous to the passenger and destroying the desired air flow pattern. End walls 126 are triangular shaped, with their outward facing sides also being slanted so that the outward facing sides are almost flush with the inner plane of rear window 128 of vehicle 116. See FIG. 3. The other facing sides of end walls 126 contain lips 130, which are essentially covered by padding strips 132. Rear window 128 is a four-section window—the two outer sections are stationary and the two inner sections are slidable, overlaying the two outer sections when rear window 128 is in the open position. Each of lips 130 (i.e., padding strips 132) are flush (contact) with one of the outer stationary sections of window 128 just beyond the opening left when the two inner sections of window 128 have been slid into the open position. See FIG. 3.

Front wall 124 contains aperture 134, which is covered by window pane 136 mounted by means of retainer casing 138 located around the bottom and two side rims of aperture 134. Retainer casings 138 should not have any holes in them so as not to divert the air flow in an undesirable manner. Window pane 136 can be constructed of glass, a durable transparent plastic (preferably Plexi-glass) or the like.

The arrows in FIG. 3 illustrate the air flow pattern over the top of truck cab 11, through air flow device 100 and into the top portion of truck cab 116.

Concerning U.S. Pat. No. 1,895,109 (Suddards), the stated air flow pattern is the reverse of the air flow pattern of the air flow device of this invention. In a recreation vehicle containing a camper mounted on the bed of a pick-up truck, the passengers are permitted to ride in the camper. With the air flow device of this invention the driver is able to communicate with those riding in the camper. The window can be removed for this purpose—Suddards' ventilator would not permit this.

In the 1930's, safety regulations were different. With Suddards' ventilator, the view is obstructed for rear view traffic for the driver—this is not so with the air flow device of this invention.

Under normal conditions, the device of this invention cannot be broken, and can be removed in seconds, and the windows can be closed. With Suddards' ventilator, if something would happen to the mechanism that opens or closes it, it would have to be replaced. With the design and construction of today's vehicles, it is almost impossible for Suddards' ventilator to be used.

1930's vehicles had many holes in the floor, e.g., with the clutch, foot brake, hand brake, floor shifting and battery case; this permitted Suddards to draw air and fumes up through the vehicle's floor. With all windows closed, this allowed Suddards to form a vacuum in the vehicle thus permitting all of the air to be drawn up through the floor of such vehicles. With the air flow device of this invention, there is no vacuum. With this invention, fresh flow of air over the recreation vehicle enters all the time thus making the recreation vehicle very comfortable and the air pleasant. Suddards' ventilator is like an exhaust fan; it draws the air out from all three sides. The air flow device of this invention is not an exhaust exit or an air exit; the air from the air flow device is drawn in and distributed in the cab of the vehicle.

The air flow device of this invention is used as an attachment for window of a recreation vehicle and the like—it is not used in place of the window—the window is not removed and still is in use. Suddards' ventilator is used in place of the rear window of cars and motor coaches designed in the late 1920's.

The air flow device of this invention is one solid component; it requires no cables, chains, rods or louvers to operate; it is made of a solid material (with only a possible cap or flap on top of the device).

The purpose of the air flow device of this invention is to supply the driver and/or passengers in the vehicle with a continous supply of air. This is accomplished without the use of louvers on its structure. When vehicle side windows are closed, Suddards' device is not in use in modern vehicles with the side windows open or closed, the air flow device of this invention provides a continuous flow of air. In pick-up trucks, the rear window is located higher than the driver or passenger thus permitting the air to flow over and above the heads of the occupants of such vehicles.

Cover 140 is composed of screen 142 and from 144. Cover 140 fits over top of the gap at the top of air flow device 100 (inside of truck cab 116). Screen 142 keeps out insects and does not seriously impede the flow of air. Cover 140 can be bolted to air scoop device by means of holes 146 and 148.

Referring to FIGS. 6 and 7, air flow device 100 can be further attached to truck cab 116 by means of bracket arm 150 and adjustable L-shaped piece 152. The upper segment of piece 152 contains padding 154.

Preferably all of the parts of air flow device 100 (except for window pane 136) is constructed of aluminum. Preferably all of the parts of the air flow device of this window are ⅛ inch thick.

In the air flow device, all metal to metal joinders are preferably welds. Preferably, non-abrasive padding material (strips) are provided for all surfaces in contact with paint.

Some of the advantages of the air flow device of this invention are: flow of air over the head of a passenger and stops the blowing of hair and prevents sore necks, shoulders, arms, etc.; there are no drafts; no water from rain can enter the cab; no water enters the cab while the truck (motor vehicle) is in motion or is standing still; prevents windows from fogging up in a rainstorm (when the motor vehicle is moving); even with the side windows closed, there is continuous air flow; is lightweight, easy to install and easy to remove; better air quality in the cab of the truck (motor vehicle) while driving; no chance of carbon monoxide poisoning in the cab of the truck due to the fact the rear window is continuously open and has continuous flow of air therethrough; and if all of the air flow device located in the rear window itself is made of plexiglass, one can see through all of the rear windows.

As used herein the term motor vehicle includes pick-up trucks, flat bed trucks, vans, four-wheel drive vehicles (flat backed), truck cabs, pick-up trucks and the like with campers mounted thereon, truck trailers, and recreation vehicles including travel trailers, motor homes and campers. As used herein the term boats includes those having a vertical, flat rear wall on the cabin.

In FIG. 8, numeral 200 represents the air flow device of another preferred embodiment of this invention. Plate unit 202 is attached at its lower extremity to downwardly-extending members 204. Plate unit 202 includes front wall 206 and two end (side) walls 208. Front wall 206 is slanted so that its top rim is offset from the plane of the rear window of truck cab 210—see FIG. 9. End walls 208 are triangular shaped, with their outward facing sides also being slanted so that the outward facing sides are almost flush with the inner plane of rear window 212 of vehicle 210. See FIG. 8. The outer facing sides of end walls 208 are essentially covered by padding strips 214. Rear window 212 is a four section window, the two outer sections being stationary and the two inner sections being slidable, overlaying the two outer sections when rear window 212 is in the open position. Air flow device 200 is attached to truck cab 210 by means of screws 218 through holes 216. Other attachment means can be used. Members 204 are welded to front wall 206. Members 204 contain padding strips 220.

Front wall 204 contains window aperture 222. Window pane 224 is hingedly attached to reinforced top lip 226 of front wall 204. See FIG. 9. For example, a piano hinge can be used—one half formed at the top of front wall 204 and the other half secured to the top of window pane 224. Spring clips 228 (or other means for keeping the window closed) secure hinged window pane 224 in place. Window pane 224 has padding strips 230.

In FIG. 10, numeral 300 represents the air flow device of the most preferred embodiment of this invention. Frame (or base plate) 302 contains downwardly-extended (back) lip 304 and two upwardly-extended lips 306. Each of lips 306 contains padding strip 308. Lip 304 is located on the back side of device 300, which fits on the outside of the truck cab. Frame 302 also contains outwardly slanted lip 310 (it is directed into the truck cab). Inside frame 312 contains outwardly slanting lip 314 and ledge 316 that mate with frame 302. Inside frame 312 contains two downwardly-extending (front) members 318, one located near each end of frame 312. Each of members 318 contains padding strip 320. Members 312 are located on the front side of device 300 and fit on the inside of the truck cab. Lip 304 and members 312 are preferably made of a material (such as, aluminum) which have a slight degree of springiness. Lip 304 and members 312 are slightly inclined towards each other in the direction of their lower extremities. This allows device 300 to tightly fit over the lower wall of the truck cab.

The bottom of transparent window unit 322 is mounted between lip 310 and lip 314 by rivets 324 or the like. Window unit 322 is preferably made of clear plexiglass (or other similar material can be used) and includes front wall 324 and two end (side) walls 326. Front wall 324 is slanted so that its top rim is offset from the perpendicular to the horizontal plate in which frame 302 is located. End walls 326 are triangular shaped, with their outward facing sides also being slanted so that the outward facing sides are almost flush with the inner plate of the rear window of the vehicle cab. The outer facing sides of end walls 326 contain lips 330, which are essentially covered by padding strips 332. The rear window is a four section window, the two outer sections being stationary and the two inner sections being slidable, overlaying the two outer sections when the rear window is in the open position. Each of lips 330 (i.e., padding strips 332) are flush (contact) with one of the outer stationary sections of the window just beyond the opening left when the two inner sections of the window have been slid into the open position. See FIG. 3.

FIG. 11 shows two air flow devices 400 mounted in the rear windows of van 402. This is another preferred embodiment of this invention. FIG. 17 shows the air flow pattern into air flow devices 400, through van 402 and out side windows 404.

Device 400 contains frame (or base plate) 406, around the edge of which is mounted rubber rim 408. See FIG. 15. Frame 406 fits in groove 410 of rim 408; lip 412 of the rear window of van 402 fits in groove 414 of rim 408. Frame 406 is preferably made of plexiglass (or aluminum). Window plate unit 416 is mounted in the middle of frame 406. Plate unit 416 includes front wall 418 and two end (side) walls 420. Front wall 418 is slanted so that its top rim is offset from the plane of the rear window. End walls 420 are triangular shaped, with their outward facing sides also being slanted so that the outward facing sides are almost flush with the inner plane of the rear window of van 402. Rear curved portion 422 helps for air gap 424. Cover 426 is hingedly mounted at 428 on the top of side walls 420 at 430 to cover gap 424. Curved members 432, pivotally mounted on one end at 434, contains curved slot 436. Lock unit 438 is mounted at the top edge of side walls 426 and fits through curved slot 436 (which allows movement or locking of cover 426).

FIG. 12 is a front elevational view of rear light window 416 of a van. The rear flight or rear window plate 416 is held in place by two sides or retainer casing 441 and bottom retainer casing 442.

The air flow device of this invention has a number of advantages. The device lessens chance of carbon monoxide poisoning in the cab of the vehicle due to the continuous flow of air. Some vehicles have faulty exhaust systems and while driving carbon monoxide may enter the vehicle; however, by using the device there is a continuous flow of air which prevents the driver from becoming nauseated or becoming sleepy, thereby preventing an accident. Flow of air is directed along the top of the vehicle cab preventing sore necks, shoulders, arms, etc., and preventing occupant discomfort (e.g., stops the blowing of hair). The device eliminates drafts in cab of vehicle. When the device is used, no water from rain can enter cab of vehicle via the rear window (regardless of whether the vehicle is in motion or standing still). The device prevents windows from fogging in a rainstorm while the vehicle is in motion. Even with the side windows of the cab closed, the device still permits continuous air flow with rear window open. The device is lightweight, easy to install and easy to remove. The device causes better air quality in cab of vehicle while driving. The device is maintenance free or requires little maintenance (e.g., no rusting, no painting, no parts to replace, no adjustment, long lasting and durable). Even though installed in the rear window of a vehicle, sight traffic to the rear (i.e., rear view) is not impaired. The device cannot be removed from the outside of vehicle, which makes unauthorized entry through the rear window extremely difficult at best.

In FIG. 18, numeral 500 represents the air flow device of a further preferred embodiment of this invention. Device 500 is completely made of a clear material, preferably plexiglass, except for the screen, pads and any other indicated part. Device 500 includes downwardly-extended (back) lip 502, base plate 504, front plate 506 and side plates 508 and 510. Padding strips 512 are located on the inside surface of lip 502. Padding strip 514 is located on the bottom surface of base plate 504. The angle between the plane of frame 504 and the plane of front plate 506 is typically 120 degrees. Both of members 516 has an upper portion 518, which is attached to the front of front plate 506, and a lower portion 520, which extends downwardly (approximately parallel to lip 502). Padding strip 522 is located on the inside of each member 516.

Front plate 506 is slanted so that its top rim is offset from the perpendicular to the horizontal plate in which base plate 504 is located. The angle of offset from the perpendicular is preferably 24 degrees, but can generally be between 5 and 30 degrees, or so. The angle of offset is critical to the extent that sufficient air inflow is allowed and the angle does not become excessive, hence harmful to the passenger and destroying the desired air flow pattern. Side plates 508 and 510 are triangular shaped, with their outward facing sides also being vertical or slanted as needed so that the outward facing sides are almost flush with the inner plane of rear window 524 of vehicle 526. See FIG. 20. The upper corner of each of side plates 508 and 510 in the direction away from front plate 506 has small rectangular piece cut out. See FIG. 20. Narrow plate 528 is attached on each end to the vertical lip of the rectangular cut out pieces of side plates 508 and 510. Padding strip 530 is mounted on the side of narrow plate 528 away from front plate 506. Screen 532 is mounted in the top open channel of device 500 by attachment to strips 534 and 536.

Side pieces 538 and 540, which are long and narrow, are mounted on side pieces 508 and 510, respectively, at a slight angle to the vertical. Padding strip 542 is mounted on the side of side pieces 538 and 540 towards front plate 506. The outer edge of padding strips 542 are tapered. Vertical triangular sections 544 reinforce side pieces 538 and 540.

Rear window 524 is a four-section sliding window—two outer sections 546 and 548 are stationary and two inner sections 550 and 552 are slidable, overlaying two outer sections 546 and 548 when rear window 524 is in the open position. The four sections (546, 548, 550 and 552) of window 524 are mounted in window frame 554 (metal track).

To mount air flow device 500 in rear window 524, inner window sections 550 and 552 are slid apart to expose the full expanse of the rear window opening. The end of window section 546 towards the opening has trim strip 556; and the end of window section 548 towards the opening has trim strip 558. The width of air flow device 500 is slightly less than the window opening between trim strips 556 and 558. The bottom portion of air flow device is inserted into the window opening from inside of truck 526. The ⊔ formed by lip 502, base plate 506 and lower portion 520 (of member 526) is placed over lower rim of window 524 (including the lower portion of frame 554). See FIGS. 18 to 20. Narrow plate 528 (actually padding strip 530) is flush against the inside side of the upper portion of window frame 554—this keeps air flow device 500 from moving on out the window opening. The end of window section 550 towards the opening has trim strip 560; and the end of window section 552 towards the opening has trim strip 562. See FIG. 21. Inner window sections 550 and 552 are moved into the opening as far as possible so that trim strips 560 and 562, respectively, are flush against side plates 508 and 510. Padding strips 542 on side pieces 538 and 540 are also flush against the trim strips 560 and 562. The inward position of inner window pieces 550 and 552 hold air flow device 500 in place from being pushed inwards into truck 526.

To remove air flow device 500, inner window sections 550 and 552 are slid to side and device 500 lifted out of position into the truck cab. As shown in FIG. 21, inner windows 550 and 552 can not be slid out of position except from the inside of truck 526.

In FIG. 22, numeral 600 represents the air flow device of a still further preferred embodiment of this invention. Device 600 is completely made of a clear material, preferably plexiglass, except for the screen, pads and any other indicated part. Device 600 includes horizontal base plate 602, front plate 604, side plates 606 and 608, bottom lip 610, back top lip 612, narrow horizontal top plate 614 and middle top lip 616. The angle between the plane of base plate 602 and the plane of front plate 604 is typically 120 degrees. Front plate 604 is slanted so that its top rim is offset from the perpendicular to the horizontal plate in which base plate 602 is located. The angle of offset from the perpendicular is preferably 20 degrees, but can generally between 5 and 30 degrees, or so. The angle of offset is critical to the extent that sufficient air inflow is allowed and the angle does not become excessive, hence harmful to the passenger and destroying the desired air flow pattern. Side plates 606 and 608 are triangular shaped. The upper corner of each of side plates 606 and 608, in the direction away from front plate 604, has small rectangular piece cut out. See FIG. 23. Narrow top plate 614, back top lip 612 and middle top lip are attached on each end to the corresponding lips of the rectangular cut out pieces of side plates 606 and 608.

Screen 618 is mounted in the top open channel of device 600. Top cover 620 is pivoted at 622 and provides a closure for the top open channel of device 600 when one desires not to use air flow device 600.

Rear window 624 of vehicle 626 has two stationary outer window sections 628 and 630 mounted in conventional rubber molding window frame 632. There is an opening between outer window sections 628 and 630 in which air flow device 600 is mounted. Window frame 632 is best shown in FIG. 24, which shows bottom lip 610 and back top lip 612 mounted in window frame 632. Side plates 606 and 608 have L-shaped vertical extensions 634 and 636, respectively. Legs 638 and 640 of extensions 634 and 636, respectively, are parallel to outer window sections 628 and 630, respectively. Padding strips 642 are mounted on the side of legs 638 and 640 facing the outer window sections. As best shown in FIG. 25, leg 640 sealingly engages the end portion of outer window section 630. (Outer window section 628 is similarly sealingly engaged).

FIG. 25a shows a further method of sealingly engaging the ends of the outer window sections. Legs 644 and 646 are perpendicular to side plate 608 and are parallel to outer window section 630. U-shaped padding strip 648 is mounted on the inside surfaces of legs 644 and 646, etc. Legs 644 and 646 sealingly engage the end of window section 630. (Outer window section 628 is similarly sealingly engaged.)

FIGS. 22 to 25 illustrates an embodiment where the air flow device is permanently mounted in a window assemblage.

What is claimed is:

1. A window containing an air flow device for a closed motor vehicle or boat for positioning in the rear aperture thereof, which comprises a window frame, two outer window sections which are stationary and mounted in the end portions of said window frame, said two outer window sections begin of such size as to form an opening therebetween, and said air flow device mounted in said opening, said air flow device comprising a base plate, a bottom lip attached on top to said base plate, and on bottom to the bottom portion of said window frame, two vertical side plates, each having one end attached to the end of the base plate, a narrow top horizontal plate attached on each end to the vertical side plates on the side towards the opening, a top vertical lip attached to the edge of said top plate towards said opening, part of the ends of said top vertical lip being attached to said side plates, a back plate which is attached at its bottom to the portion of said base plate inside of said motor vehicle and is positioned with its top away from said top horizontal plate or the vertical plane of said opening thereby forming a gap between said top horizontal plate and said back plate, and an extension of the edge of each of said side plates facing said opening which provides means of sealingly engaging the end of one of said outer window sections facing the opening, at least said back plate being transparent, said two side plates being generally triangular in shape, being attached on one edge to said back plate and preventing lateral air flow.

2. The window as claimed in claim 1 wherein said extension of said edge of each of said side plates is L-shaped, the leg thereof which is parallel to said outer window section sealingly engaging said end of one of said outer windows.

3. The window as claimed in claim 1 wherein said extension of said edge of each of said plates contains two short parallel strips which are perpendicular to said extension, said two short parallel strips sealingly engaging therebetween said end of one of said outer windows.

4. An air flow device for a closed motor vehicle or boat for positioning in the rear aperture thereof, a rim unit fitting around the entire rim of said rear aperture, at least a portion of the top part of said rim unit having a longitudinal groove therein and at least a portion of the part of said rim unit having a longitudinal groove therein, which comprises (i) a plate, which has a central aperture and which fits within said rear aperture, the top and bottom edges of said plate fitting in said top groove and said bottom groove, respectively, in said rim unit, (ii) a slanted plate, which is attached at its bottom to the bottom edge of said central aperture of said plate and which extends upwardly and inwardly therefrom, thereby forming a gap between the top of said slanted plate and the vertical plane of said rear aperture, and (iii) two side members, each of which is attached on one side to said plate and on the other side to said slanted plate, thereby preventing lateral air flow.

5. An air flow device as claimed in claim 4 wherein said plate is essentially flat.

6. An air flow device as claimed in claim 4 wherein said plate is convex in the direction away from the side of said plate on which said two side members are attached, and in the horizontal axis of said plate.

7. An air flow device as claimed in claim 4 wherein said slanted plate is transparent.

8. An air flow device as claimed in claim 4 wherein a member having an aperture therein is positioned over said gap.

9. In combination, a closed motor vehicle or boat, said motor vehicle or boat having a rear aperture, a rim unit fitting around the entire rim of said rear aperture, at least a portion of the top part of said rim unit having a longitudinal groove therein and at least a portion of the part of said rim unit having a longitudinal groove therein, and an air flow device positioned in said rear aperture, said air flow device comprising (i) a plate, which has a central aperture and which fits within said rear aperture, the top and bottom edges of said plate fitting in said top groove and said bottom groove, respectively, in said rim unit, (ii) a slanted plate, which is attached at its bottom to the bottom edge of said central aperture of said plate and which extends upwardly and inwardly therefrom, thereby forming a gap between the top of said slanted plate and the vertical plane of said rear aperture, and (iii) two side members, each of which is attached one side to said plate and on the other side to said slanted plate, thereby preventing lateral air flow.

10. An air flow device combination as claimed in claim 9 wherein said plate is essentially flat.

11. An air flow device combination as claimed in claim 9 wherein said plate is convex in the direction away from the side of said plate on which said two side members are attached, and in the horizontal axis of said plate.

12. An air flow device as claimed in claim 9 wherein said slanted plate is transparent.

13. An air flow device as claimed in claim 9 wherein a member having an aperture therein is positioned over said gap.

14. An air flow device combination as claimed in claim 9 wherein at least one stationary window section and/or at least one non-stationary window section is mounted in said rear aperture and leaves an opening in said rear aperture, in which said air flow device is positioned.

15. An air flow device combination as claimed in claim 14 wherein said at least one non-stationary window section is slidably mounted in said rim unit.

16. An air flow device as claimed in claim 14 wherein two outer window sections, which are stationary, are mounted in the end portions of said rear aperture, the edges of each of said outer window sections which are adjacent to an edge of said rear aperture can form part of said rim, said two outer window sections being of such size as to form an opening therebetween, and said air flow device is positioned in said opening formed by said two outer window sections.

17. An air flow device as claimed in claim 14 wherein at least one inner window section is slidably mounted in said top longitudinal groove and said bottom longitudinal groove of said rear aperture, said at least inner window section is of such size as to close off said opening when said at least one inner window section is slid into the closing position and to fully open said opening when said at least one inner window section is slid into the open position.

18. An air flow device as claimed in claim 14 wherein two inner window sections are slidably mounted in said top longitudinal groove and said bottom longitudinal groove of said rear aperture, said two inner window sections are of such size as to close off said opening when said two inner window sections are slid together and to fully open said opening when said two inner window sections are slid sufficiently far apart.

* * * * *